United States Patent
Vallabhu et al.

(10) Patent No.: US 9,642,055 B2
(45) Date of Patent: May 2, 2017

(54) TECHNIQUES FOR SWITCHING BETWEEN WIRELESS NETWORKS

(71) Applicant: INTEL CORPORATION, Santa Clara, CA (US)

(72) Inventors: Venkata Vallabhu, Aloha, OR (US); Necati Canpolat, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 26 days.

(21) Appl. No.: 14/129,942

(22) PCT Filed: Sep. 27, 2013

(86) PCT No.: PCT/US2013/062330
§ 371 (c)(1),
(2) Date: Dec. 28, 2013

(87) PCT Pub. No.: WO2015/047322
PCT Pub. Date: Apr. 2, 2015

(65) Prior Publication Data
US 2015/0181486 A1    Jun. 25, 2015

(51) Int. Cl.
*H04W 36/14*    (2009.01)
*H04W 36/18*    (2009.01)
*H04W 88/06*    (2009.01)

(52) U.S. Cl.
CPC ........... *H04W 36/14* (2013.01); *H04W 36/18* (2013.01); *H04W 88/06* (2013.01)

(58) Field of Classification Search
None
See application file for complete search history.

(56) References Cited

U.S. PATENT DOCUMENTS

| 7,177,952 | B1 | 2/2007 | Wurch et al. | |
| 8,848,608 | B1* | 9/2014 | Addepalli et al. | 370/328 |
| 2006/0056446 | A1 | 3/2006 | Lee et al. | |
| 2008/0069065 | A1* | 3/2008 | Wu et al. | 370/340 |
| 2013/0260804 | A1 | 10/2013 | Ha et al. | |
| 2014/0254565 | A1* | 9/2014 | Pitchaiah et al. | 370/336 |
| 2014/0334335 | A1* | 11/2014 | Barathalwar | 370/254 |
| 2015/0172181 | A1* | 6/2015 | Okabe | G06F 9/445 709/202 |
| 2015/0304892 | A1* | 10/2015 | Perras | H04W 36/0005 370/331 |

FOREIGN PATENT DOCUMENTS

KR    101199576 B1    11/2012

OTHER PUBLICATIONS

International Search Report and Written Opinion, Mailed Date: Jun. 27, 2014, Application No. PCT/US2013/062330, Filed Date: Sep. 27, 2013, pp. 11.

* cited by examiner

*Primary Examiner* — Hassan Phillips
*Assistant Examiner* — Duc Duong (57) ABSTRACT

Examples are disclosed for switching between wireless networks. In some examples a method for switching between wireless network may comprise creating a virtual wireless adapter, maintaining a first wireless connection with a first wireless network, initiating a second wireless connection with a second wireless network using the virtual wireless adapter, disconnecting the first wireless connection with the first wireless network, and establishing the second wireless connection with the second wireless network. Other examples are described and claimed.

21 Claims, 6 Drawing Sheets

TECHNIQUES FOR SWITCHING BETWEEN WIRELESS NETWORKS

TECHNICAL FIELD

Examples described herein are generally related to techniques for switching between wireless networks.

BACKGROUND

Wireless devices may include capabilities to access the Internet or to connect with other wireless devices using various wireless access technologies. For example, wireless devices may communicatively couple to a wireless local area network (WLAN) using wireless technologies such as Wi-Fi™. A wireless device using Wi-Fi wireless technologies may, for example, couple to the WLAN through an access point. Also, before the wireless device can communicate over the Internet an Internet Protocol (IP) address may be obtained from a Dynamic Host Configuration Protocol (DHCP) server. Currently these and other steps must be performed by a wireless device when establishing a first connection with a first WLAN and must be repeated each time that the wireless device transitions to a different connection with a different WLAN. This process can be time consuming and may result in a lack of wireless connectivity during the transition from one WLAN to the next. It is with respect to these and other considerations that the embodiments described herein are needed.

DETAILED DESCRIPTION

Examples are generally directed to improvements for wireless devices to enable smooth WLAN network to WLAN network switching. The wireless technologies described herein may include wireless technologies suitable for use with wireless devices or user equipment (UE) or access points deployed in a WLAN. For example, wireless devices or access points for a WLAN may be configured to operate in compliance with various WLAN standards promulgated by the Institute of Electrical Engineers (IEEE). These WLAN standards may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

While described herein as relating to WLAN and/or Wi-Fi technologies and standards, this disclosure is not limited to WLAN related standards, but may also apply to wireless wide area networks (WWANs) and 3G or 4G wireless standards (including progenies and variants) related to access points, wireless devices, UEs or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9, 10 or 11 of LTE/System Architecture Evolution (SAE), and so forth. The examples are not limited in this context. In some examples regarding WLANs, various IEEE standards associated with IEEE 802.11 such as IEEE 802.11a/g, IEEE 802.11ac, IEEE 802.11ad or IEEE 802.11ah may be utilized by wireless devices or access points to establish or maintain communication links within a WLAN. Also, wireless device or access points may seek to obtain IP addresses in accordance with various Dynamic Host Control Protocol (DHCP) standards such as those described in Internet Engineering Task Force (IETF) Request for Comments (RFC) 2131, published March 1997, described in IETF RFC 3315, published July 2003 or described in IETF RFC 6422, published December 2011.

According to some examples, a wireless device may first implement association and authentication processes with an access point for a WLAN. Upon successful authentication, the wireless device may then be able to communicate with a DHCP server through the access point. The wireless device may then exchange a series of DHCP messages with the DHCP server to obtain an IP address and subsequently gain access to the Internet via the access point. Typically, the process of gaining access to the WLAN and then obtaining an IP address from the DHCP server may be characterized as a serial or linear Wi-Fi connection process. This serial or linear process may be time consuming from a perspective of a roaming device that may move between WLANs. In current solutions, a wireless device can only connect to one WLAN at a time. When a wireless device roams or otherwise requires a new WLAN connection, a current connection must be disconnected before a new connection can be initiated and established which can take several seconds and may result in no connection if the new WLAN requires authentication, etc. The time consuming Wi-Fi connection process, along with other limitations as one skilled in the art will recognize, may degrade user experience and may be problematic to achieving a seamless Wi-Fi connection from the user's perspective when attempting to transition from one WLAN to another WLAN. It is with respect to these and other challenges that the examples described herein are needed.

In some examples, techniques are implemented for enabling smooth WLAN network to WLAN networking switching. In various embodiments these techniques include creating a virtual wireless adapter, maintaining a first wireless connection with a first wireless network, initiating a second wireless connection with a second wireless network using the virtual wireless adapter, disconnecting the first wireless connection with the first wireless network, and establishing the second wireless connection with the second wireless network. The embodiments are not limited in this respect.

Figure 1:
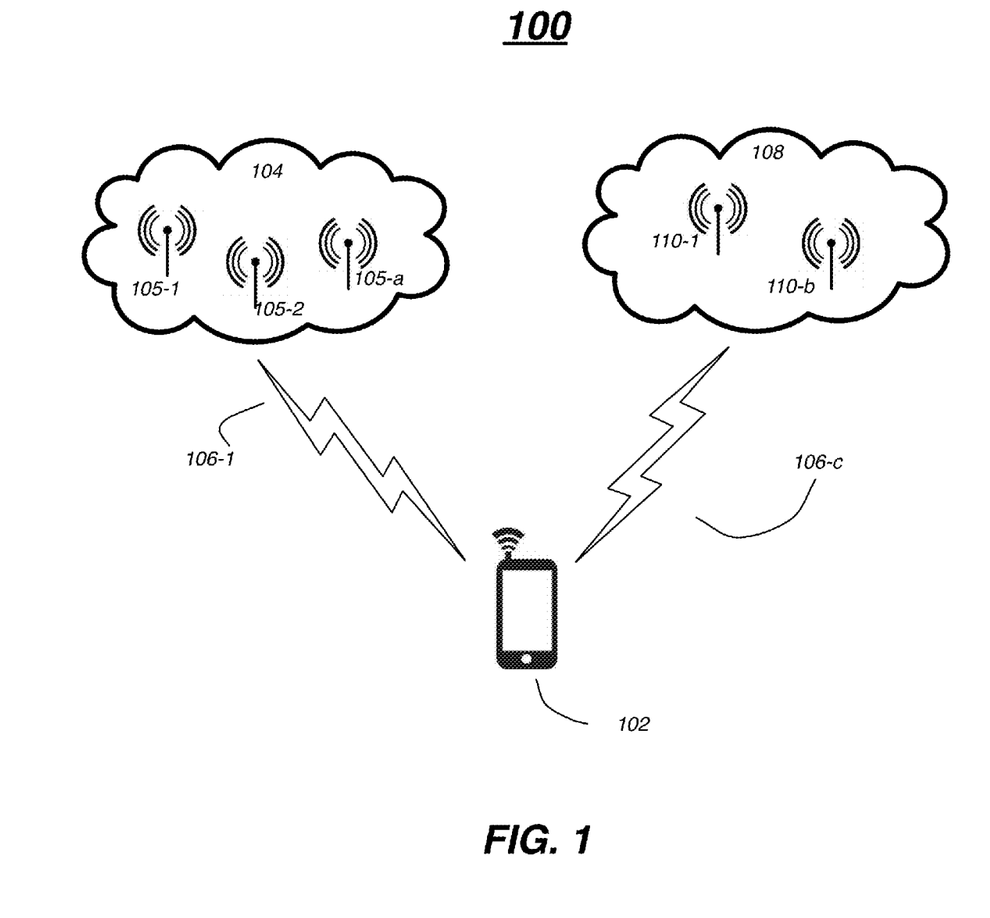
FIG. 1 illustrates an example of a system.

FIG. 1 illustrates an example system 100. In some examples, as shown in FIG. 1, system 100 includes WLAN networks 104 and 108 that include access points 105-a and 110-c respectively where a, b and similar designators represent any positive integer. System 100 may also include a wireless and/or mobile device 102 that is operative to establish a connection with one or more of WLAN networks 104, 108 via wireless signals 106-c exchanged between the wireless device 102 and one of access points 105-a, 110-c. The wireless device may comprise a mobile phone, smartphone, personal digital assistant, wearable computing device, tablet computer, ultrabook computer, a desktop computer, monitor or display, a laptop computer, an access point (AP) device, a server device, or other suitable devices that may transmit and receive radio frequencies when communicating with wireless enabled devices such as, APs 105-b, 110-c. While not shown in FIG. 1, APs 105-b, 110-c may couple to DHCP server via a communication channel to enable wireless device 102 to access the Internet. It should be understood that this disclosure is not limited to a particular number, type or arrangement of APs, WLAN networks or wireless devices 102 as shown in FIG. 1. Any number of APs, WLAN networks and/or wireless devices could be used and still fall within the described embodiments. For example, some embodiments may comprise a public hotspot with numerous APs or a single AP enabled WLAN. The embodiments are not limited in this respect.

In some examples, WLAN 104, 108 may be arranged to operate according to the one or more wireless network technologies associated with IEEE 802.11. For these examples, wireless device 102 may attempt to establish a Wi-Fi connection to access the Internet via respective wireless communication links 106-c with one of APs 105-b, 110-c. As described more below, wireless device 102 may include logic and/or features to maintain a connection with one of APs 105-b of WLAN 104 and may simultaneously communicate information to one of APs 110-c of WLAN 108 to initiate a connection with WLAN 108 prior to disconnecting from WLAN 104 to decrease the time needed to transition from WLAN 104 to WLAN 108 and improve the user experience of a user of wireless device 102. Other embodiments are described and claimed.

Figure 2:
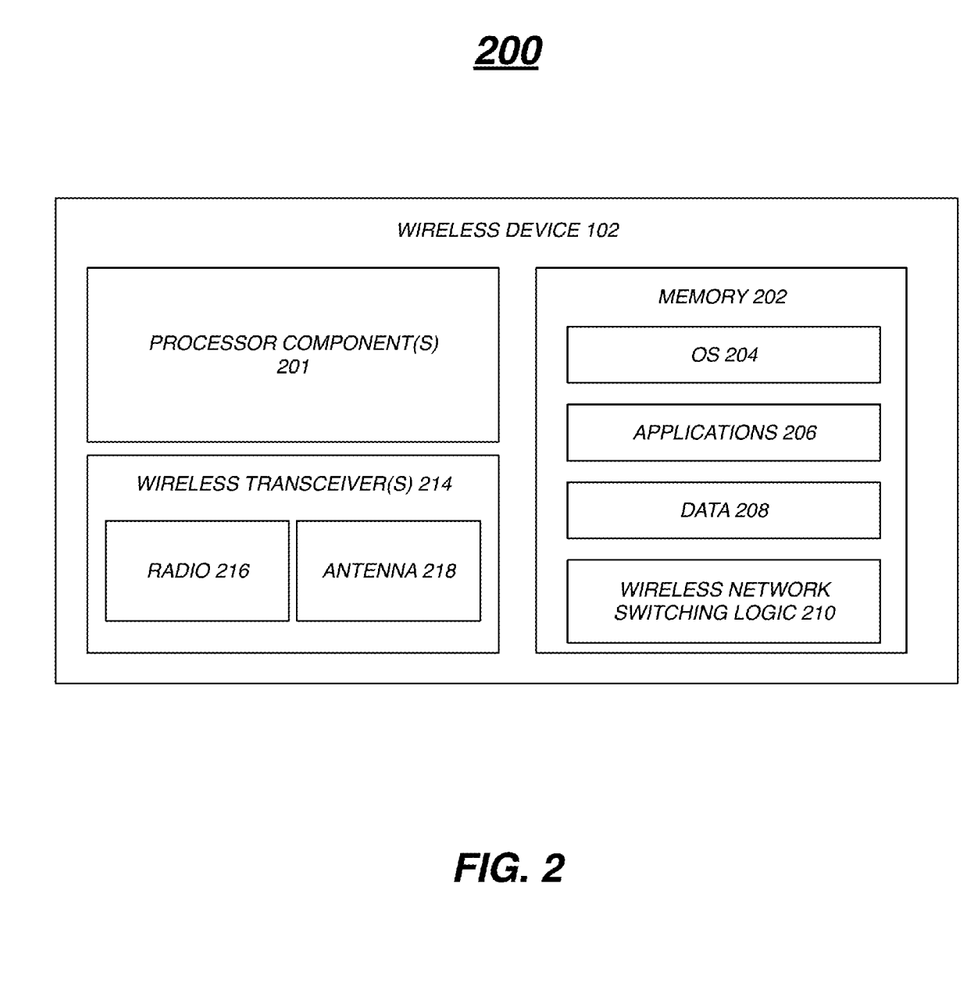
FIG. 2 illustrates an example block diagram for a first apparatus.

FIG. 2 illustrates a block diagram for a first apparatus. As shown in FIG. 2, the first apparatus includes an apparatus 200. Although apparatus 200 shown in FIG. 2 has a limited number of elements in a certain topology or configuration, it may be appreciated that apparatus 200 may include more or less elements in alternate configurations as desired for a given implementation. In various embodiments, the apparatus 200 may comprise a wireless device 102 as shown in FIG. 1.

The apparatus 200 may comprise a computer and/or firmware implemented apparatus 200 having a processor component 201 arranged to execute instructions, modules, logic and/or one or more other components of apparatus 200. It is worthy to note that "a" and "b" and "c" and similar designators as used herein are intended to be variables representing any positive integer. Thus, for example, if an implementation sets a value for a=3, then a complete set of components 102-a may include modules 102-1, 102-2, and 102-3. The embodiments are not limited in this context.

According to some examples, apparatus 200 may be part of a wireless device such as wireless device 102 that may be capable of operating in compliance with one or more wireless technologies or standards such as WLAN and/or Wi-Fi wireless technologies. For example, the wireless device having apparatus 200 may be arranged or configured to wirelessly couple to a device, such as one of APs 105-b, 110-c. The examples are not limited in this context.

In some examples, as shown in FIG. 2, apparatus 200 includes processor component 201. Processor component 201 may be generally arranged to execute one or more components, instructions, logic or applications for the apparatus 200. The processor component 201 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor component 201. According to some examples processor component 201 may also be an application specific integrated circuit (ASIC) and other components of apparatus 200 may be implemented as hardware elements of the ASIC. Processor component 201 may be a single processing unit or a number of processing units, all of which may include single or multiple computing units or multiple cores. The processor component 201 may be implemented as one or more microprocessors, microcomputers, microcontrollers, digital signal processors, central processing units, state machines, logic circuitries, and/or any devices that manipulate signals based on operational instructions. Among other capabilities, the processor component 201 may be configured to fetch and execute computer-readable instructions or processor-accessible instructions stored in a memory 202 or other computer-readable storage media.

Memory 202 is an example of non-transitory computer-readable storage media for storing instructions to be executed by the processor component 201 to perform the various functions described herein. For example, memory 202 may generally include both volatile memory and non-volatile memory (e.g., RAM, ROM, or the like). Memory 202 may be referred to as memory or computer-readable storage media herein. Memory 202 is capable of storing computer-readable, processor-executable program instructions as computer program code that may be executed by the processor component 201 as a particular machine configured for carrying out the operations and functions described in the implementations herein.

Memory 202 may include one or more operating systems 204, and may store one or more applications 206. The operating systems 204 may be one of various known and future operating systems implemented for personal computers, audio video devices, mobile devices, smartphones, tablets and the like. The applications 206 may include preconfigured/installed and downloadable applications. In addition, memory 202 may include data 208 to store the installed and downloaded applications. The embodiments are not limited in this respect.

Memory 202 includes wireless network switching logic 210 that may be configured to enable smooth and/or fast switching between WLAN networks in some embodiments. For example, the wireless network switching logic 210 may enable wireless device 102 to create a virtual network adapter by splitting the Wi-Fi stack to allow the wireless device 102 to maintain a connection with a first WLAN while initiating a connection with a second WLAN as described in more detail elsewhere herein.

In an implementation, the wireless device 102 may include a wireless transceiver 214. In various embodiments, wireless transceiver 214 may include a radio 216 and antenna 218. In an implementation, the radio 216 and antenna 218 may be used to establish a wireless connection with one or APs 105-b, 110-c and to communicate information between wireless device 102 and APs 105-b, 110-c. The embodiments are not limited in this respect.

The example wireless device 102 described herein is merely an example that is suitable for some implementations and is not intended to suggest any limitation as to the scope of use or functionality of the environments, architectures and frameworks that may implement the processes, components and features described herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, a computer program product may implement the processes and components described herein.

As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Figure 3:
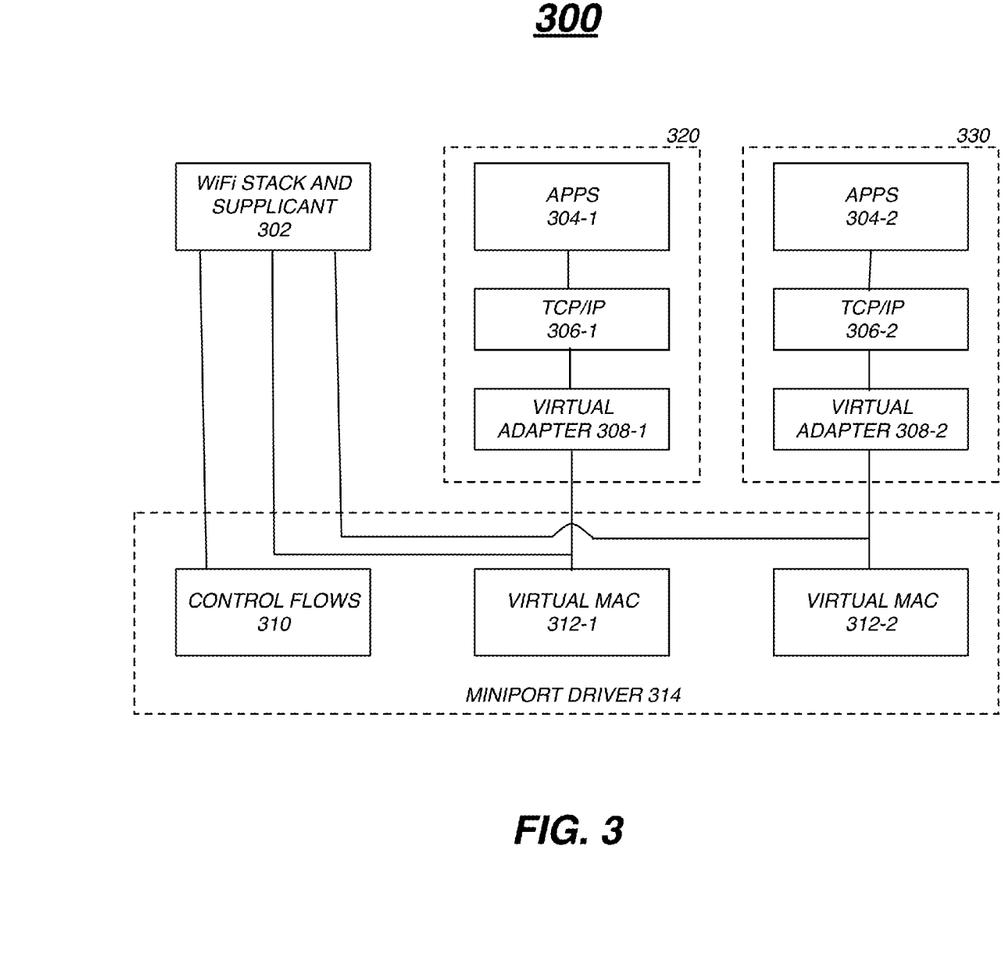
FIG. 3 illustrates an example block diagram for a second apparatus.

FIG. 3 illustrates a block diagram for a second apparatus. As shown in FIG. 3, the second apparatus includes an apparatus 300. Although apparatus 300 shown in FIG. 3 has a limited number of elements in a certain topology or configuration, it may be appreciated that apparatus 300 may include more or less elements in alternate configurations as desired for a given implementation. In various embodiments, the apparatus 300 may comprise a portion of wireless device 102 and/or apparatus 200. The embodiments are not limited in this respect.

In various embodiments the apparatus 300 may comprise a portion of wireless device 102 and/or apparatus 200 that enables the apparatus 300 to smoothly and quickly switch between WLAN networks. The apparatus 300 may include additional details of the wireless network switching logic 110 of wireless device 102 and/or radio 216 of apparatus 200 in some embodiments. Other embodiments are described and claimed.

To establish a WLAN connection a plurality of steps need to be performed by a wireless device such as wireless device 102. For example, wireless mobile device 102 would typically need to scan for an available WLAN or Wi-Fi network, associate with a network, perform some form of authentication with the WLAN network, and acquire an IP address. Additional steps may also include checking for Internet access associated with the network and checking the signal quality and/or bandwidth of any associated connection.

These steps need to be performed by a wireless and/or mobile device each time that a connection with a WLAN is established. Therefore, a wireless device can perform these steps to establish a connection with a first WLAN, however, if the wireless device is to be moved to a second, different WLAN, these steps must be repeated. Unfortunately, currently solutions require that the wireless and/or mobile device disconnect from the first WLAN before performing these steps to establish a connection with the second WLAN. As a result, the user experience for a user of the wireless device is degraded because they are required to wait for these steps to be performed to re-establish a wireless connection. During this delay, which can be several seconds in length, applications requiring a connection may time out, ongoing work may be lost and other problems may occur. As a result, it is desirable to decrease the time required to transition from one WLAN to another WLAN.

As shown in FIG. 3, this may be accomplished in some embodiments by splitting a wireless stack 302 into two or more virtual wireless adapters 308-1, 308-2. In this manner, the apparatus 300 may be able to maintain a first wireless connection with a first wireless network using a first 308-1 of the two or more virtual wireless adapters and initiate a second wireless connection with a second wireless network using a second 308-2 of the two or more virtual wireless adapters. After imitating the second connection and performing several of the required connection steps successfully described above using the second virtual wireless adapter 308-2, the apparatus 300 can disconnect the first wireless connection with the first wireless network and establish the second wireless connection with the second wireless network. Once the second connection is established successfully, the apparatus 300 can remove any unused virtual wireless adapters in some embodiments.

In various embodiments, to enable smooth switching between WLAN networks, the WLAN/Wi-Fi stack 302 may be operative to automatically or manually (e.g. via user selection) select a WLAN network with which the apparatus 300 will establish a connection. This network may comprise a different WLAN network than a WLAN network with which the apparatus 300 current has a connection in some embodiments. The stack 302 may create a virtual adapter 308-1, 308-2 and may request the miniport driver or device 314 to create a new MAC 312-1, 312-2. In various embodiments, the virtual stacks 320, 330 may comprise separate virtual stacks that use the same radio of apparatus 300. For example, the stack 320 may comprise the original stack that is then divided to create the additional stack 330. The stack 320, implemented in hardware, software or a combination of hardware and software, may be used to maintain an existing connection while the stack 330 is used to initiate a new connection while maintaining the existing connection. The embodiments are not limited in this respect.

The stack 302 may set the network confirmation in a driver and may start the network connection using standard network connection flows/steps as described above. In some embodiments, the miniport driver 314 may find the network and associate with the network without breaking the current connection using the virtual MAC 312-2. After acquiring a DHCP address, the stack 330 may verify the Internet connection and quality of the connection associated with the new WLAN. If the Internet connection and quality is sufficient, the stack 320 may disconnect from the previous connection and the new connection via stack 330 may become the existing connection. At this point, in various embodiments, the stack 330 may be operative to move applications 304-1 to the new stack 330 (e.g. with applications 304-2 and to the new virtual adapter 308-2. Once complete, this may allow the apparatus 300 to disconnect from the original WLAN and remove the unused/disconnected virtual adapter 320. Other embodiments are described and claimed.

In various embodiments, the wireless network switching logic in mobile device 210 may be operative to automatically select the second/new wireless network from a list of available wireless networks based on one or more characteristics of the first wireless network or one or more characteristics of the second wireless network. For example, the logic 210 may determine that an existing connection has degraded to below a connection quality or bandwidth threshold requiring a new connection for the wireless device 102. In other embodiments, the logic 210 may determine that the connection quality, speed, bandwidth or other suitable parameter of the second/new network is superior to that of the existing connection. These and other examples may result in an automatic selection of the second/new connection by the logic 210.

In other embodiments, the logic 210 may be operative to receive an input signal indicating manual selection of the second wireless network from a list of available wireless networks. For example, a user may select the second network from a list of available networks. This may be performed using any suitable input mechanism on wireless device 102, such as making such an indicating on a touch screen display of the wireless device 102. The embodiments are not limited in this respect.

The first and second wireless connection may be established using a same radio 216 of wireless device 102 in some embodiments. For example, the first and second wireless networks may comprise different wireless local area networks (WLAN), each requiring use of a same Wi-Fi radio.

If it is determined that the second/new wireless connection was successfully established, the logic 210 may be operative to reduce the number of virtual stacks to one stack. For example, the stack 320 which was being used to maintain the original connection may be removed once it is determined that the second/new connection has successfully been established using stack 330. In various embodiments, this may be determined based on the wireless network switching logic 210 acquiring one or more of a Dynamic Host Configuration Protocol (DHCP) address or an Internet Protocol (IP) address from the second wireless network using the second of the two virtual wireless adapters 308-2. Other embodiments are described and claimed.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 4:
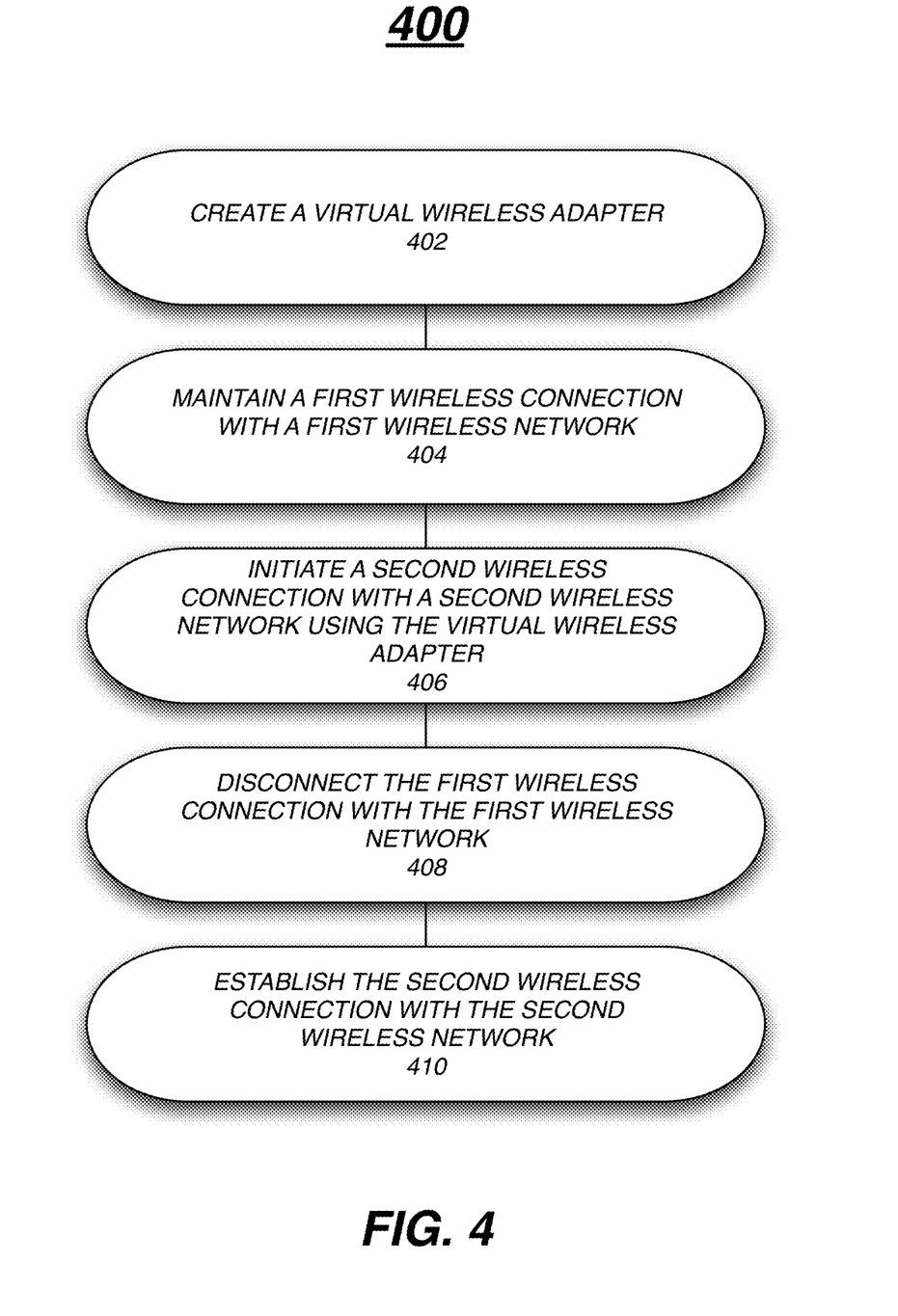
FIG. 4 illustrates an example of a first logic flow.

FIG. 4 illustrates an example of a logic flow. As shown in FIG. 4, the logic flow includes a logic flow 400. Logic flow 400 may be representative of some or all of the operations executed by one or more logic, features, or devices described herein, such as device 102, apparatus 200 and/or apparatus 300. More particularly, logic flow 400 may comprise wireless network switching logic 210 of wireless device 102 in some embodiments. The embodiments are not limited in this respect.

In the illustrated example shown in FIG. 4, logic flow 400 at block 402 may comprise creating a virtual wireless adapter. For example, wireless device 102 may include a Wi-Fi stack that is split, where a first virtual portion of the split stack is used to maintain an existing WLAN connection and the second virtual portion of the split stack is used to establish a second test connection while maintaining the first connection, all using the same radio 216. In various embodiments, the logic flow at 404 may comprise maintaining a first wireless connection with a first wireless network. For example, after splitting the stack to create the virtual wireless adapter, the other part of the stack may maintain an existing connection with a WLAN network. At block 406 the logic flow may include initiating a second wireless connection with a second wireless network using the virtual wireless adapter. For example, the virtual wireless network adapter may be operative to perform the steps necessary to establish a wireless connection (e.g. scanning for a network, associated with a network, authenticating the user and acquiring an IP address) all while the original connection is maintained. In some embodiments, the logic flow at block 408 may comprise disconnecting the first wireless connection with the first wireless network and at block 410 may comprise establishing the second wireless connection with the second wireless network. For example, once the wireless device 102 determines that the second connection is acceptable via the virtual wireless adapter, the first connection may be disconnected.

In various embodiments, because several of the connection steps will have already been performed by the virtual wireless adapter prior to disconnected from the first connection, establishing the second wireless connection may happen more quickly and smoothly compared to current techniques. For example, the logic flow may also comprise verifying the second wireless connection using the virtual wireless adapter. This verification, which may occur while the first wireless connection is maintained, may reduce the transition time to the second wireless network. An additional step that may result in a reduced transition time may comprise acquiring one or more of a Dynamic Host Configuration Protocol (DHCP) address or an Internet Protocol (IP) address from the second wireless network using the virtual wireless adapter.

In some embodiments, the logic flow may comprise automatically selecting the second wireless network from a list of available wireless networks based on one or more characteristics of the first wireless network or one or more characteristics of the second wireless network. Alternatively, the logic flow may comprise receiving an input signal indicating manual selection of the second wireless network from a list of available wireless networks. The embodiments are not limited in this respect.

As described elsewhere herein, the first and second wireless connections may be established using a same wireless radio and the first and second wireless networks may comprise wireless local area networks (WLAN). Other embodiments are described and claimed.

In some embodiments the logic flow may comprise creating the virtual wireless adapter by splitting a wireless local area network (WLAN) stack into two or more virtual stacks. In various embodiments, a first of the two or more virtual stacks may be operative to maintain the first wireless connection and a second of the two or more virtual stacks may be operative to initiate the second wireless connection.

As part of the transition process to the second wireless network, the logic flow may comprise determining that the second wireless connection was successfully established and, as a result, the number of virtual stacks may be reduced to one stack. Once the second wireless connection has been established, the logic flow may comprise transitioning one or more applications to the second wireless network. For example, any applications that are running on the wireless device 102 that may require an Internet connection may be migrated to the second wireless connection. The embodiments are not limited in this respect.

Figure 5:
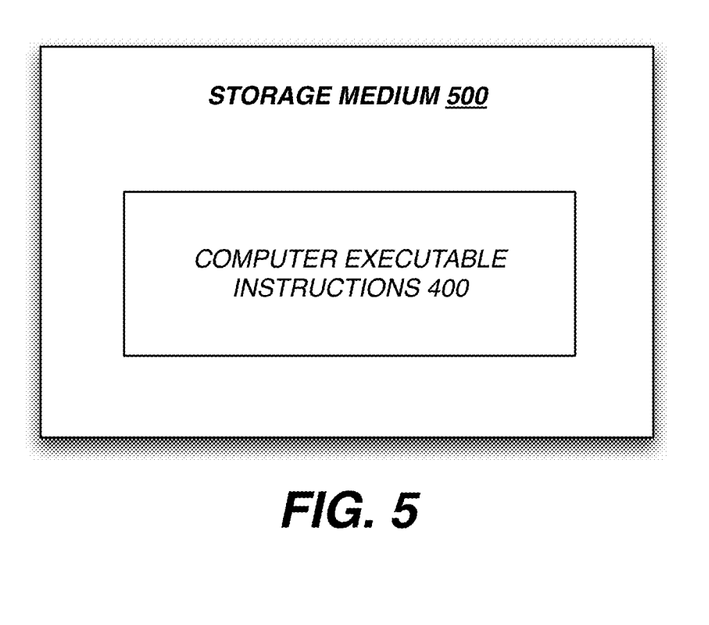
FIG. 5 illustrates an example of a storage medium.

FIG. 5 illustrates an embodiment of a first storage medium. As shown in FIG. 5, the first storage medium includes a storage medium 500. Storage medium 500 may comprise an article of manufacture. In some examples, storage medium 500 may include any non-transitory computer readable medium or machine-readable medium, such as an optical, magnetic or semiconductor storage. Storage medium 500 may store various types of computer executable instructions, such as instructions to implement logic flow 400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
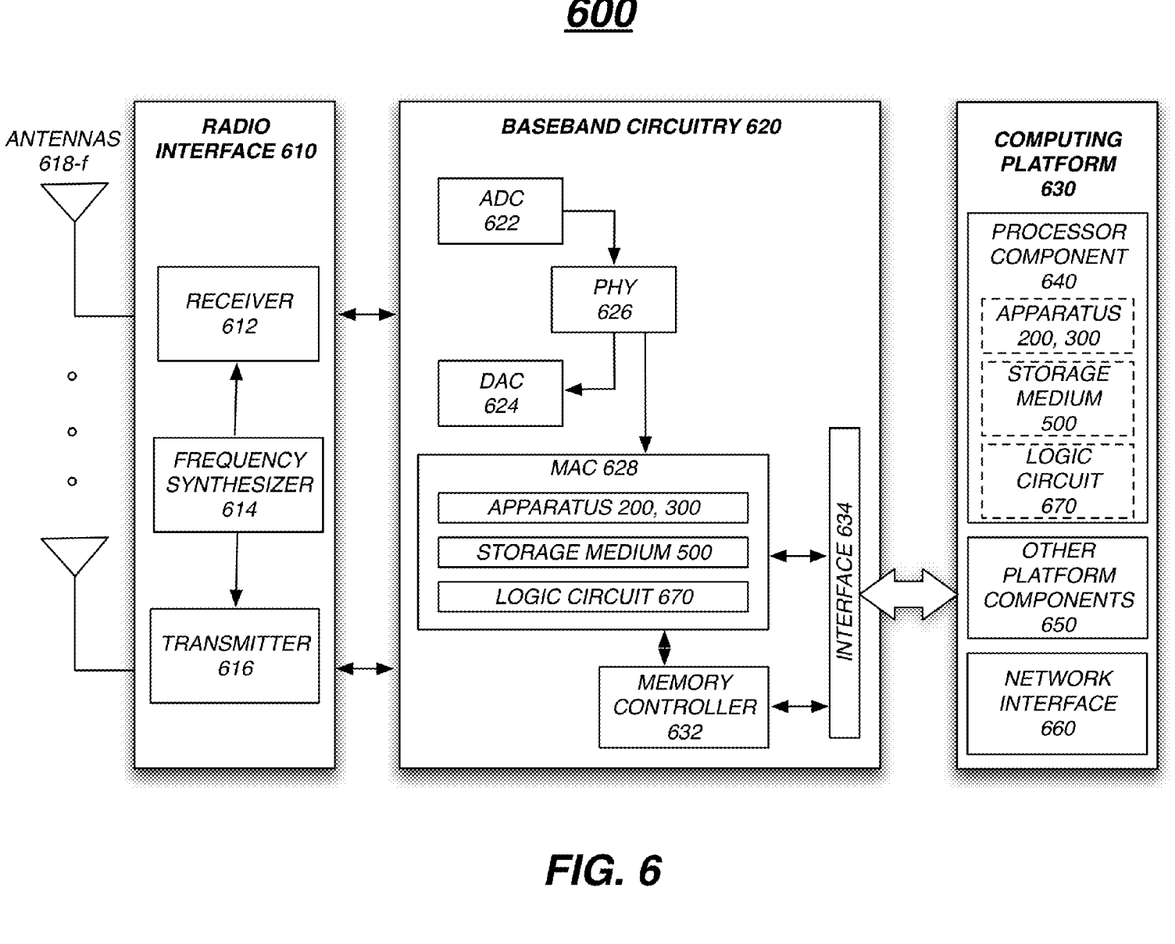
FIG. 6 illustrates an example of a device.

FIG. 6 illustrates an embodiment of a device 600. In some examples, device 600 may be configured or arranged for wireless communications in a wireless network. Device 600 may implement, for example, apparatus 200/300, storage medium 500 and/or a logic circuit 670. The logic circuit 670 may include physical circuits to perform operations described for apparatus 200/300. As shown in FIG. 6, device 600 may include a radio interface 610, baseband circuitry 620, and computing platform 630, although examples are not limited to this configuration. The device 600 may implement some or all of the structure and/or operations for apparatus 200/300, storage medium 500 and/or logic circuit 670 in a single computing entity, such as entirely within a single device. The embodiments are not limited in this context.

Radio interface 610 may include a component or combination of components adapted for transmitting and/or receiving single carrier or multi-carrier modulated signals (e.g., including complementary code keying (CCK) and/or orthogonal frequency division multiplexing (OFDM) symbols and/or single carrier frequency division multiplexing (SC-FDM symbols) although the embodiments are not limited to any specific over-the-air interface or modulation scheme. Radio interface 610 may include, for example, a receiver 612, a transmitter 616 and/or a frequency synthesizer 614. Radio interface 610 may include bias controls, a crystal oscillator and/or one or more antennas 618-f. In another embodiment, radio interface 610 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 620 may communicate with radio interface 610 to process receive and/or transmit signals and may include, for example, an analog-to-digital converter 622 for down converting received signals, a digital-to-analog converter 624 for up converting signals for transmission. Further, baseband circuitry 620 may include a baseband or physical layer (PHY) processing circuit 626 for PHY link layer processing of respective receive/transmit signals. Baseband circuitry 620 may include, for example, a processing circuit 628 for medium access control (MAC)/data link layer processing. Baseband circuitry 620 may include a memory controller 632 for communicating with MAC processing circuit 628 and/or a computing platform 630, for example, via one or more interfaces 634.

In some embodiments, PHY processing circuit 626 may include a frame construction and/or detection module, in combination with additional circuitry such as a buffer memory, to construct and/or deconstruct communication frames (e.g., containing subframes). Alternatively or in addition, MAC processing circuit 628 may share processing for certain of these functions or perform these processes independent of PHY processing circuit 626. In some embodiments, MAC and PHY processing may be integrated into a single circuit.

Computing platform 630 may provide computing functionality for device 600. As shown, computing platform 630 may include a processing component 640. In addition to, or alternatively of, baseband circuitry 620 of device 600 may execute processing operations or logic for apparatus 200/300, storage medium 500, and logic circuit 670 using the processing component 630. Processing component 640 (and/or PHY 626 and/or MAC 628) may comprise various hardware elements, software elements, or a combination of both. Examples of hardware elements may include devices, logic devices, components, processors, microprocessors, circuits, processor circuits (e.g., processor circuit 620), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 630 may further include other platform components 650. Other platform components 650 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 630 may further include a network interface 660. In some examples, network interface 660 may include logic and/or features to support network interfaces operated in compliance with one or more wireless broadband technologies such as those described in one or more standards associated with IEEE 802.11 such as IEEE 802.11ad.

Device 600 may be, for example, user equipment, a computer, a personal computer (PC), a desktop computer, a laptop computer, a notebook computer, a netbook computer, a tablet computer, an Ultrabook™ computer, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 600 described herein, may be included or omitted in various embodiments of device 600, as suitably desired. In some embodiments, device 600 may be configured to be compatible with protocols and frequencies associated with IEEE 802.11 Standards for WLANs and/or for wireless docking, although the examples are not limited in this respect.

Embodiments of device 600 may be implemented using single input single output (SISO) antenna architectures. However, certain implementations may include multiple antennas (e.g., antennas 618-*f*) for transmission and/or reception using adaptive antenna techniques for beamforming or spatial division multiple access (SDMA) and/or using multiple input multiple output (MIMO) communication techniques.

The components and features of device 600 may be implemented using any combination of discrete circuitry, application specific integrated circuits (ASICs), logic gates and/or single chip architectures. Further, the features of device 600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 600 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The following examples pertain to further embodiments.

In example one, a method for switching between wireless networks, may comprise creating a virtual wireless adapter, maintaining a first wireless connection with a first wireless network, initiating a second wireless connection with a second wireless network using the virtual wireless adapter, disconnecting the first wireless connection with the first wireless network, and establishing the second wireless connection with the second wireless network.

In example two, the method of example 1 may comprise verifying the second wireless connection using the virtual wireless adapter.

In example three, the method of example 1 may comprise automatically selecting the second wireless network from a list of available wireless networks based on one or more characteristics of the first wireless network or one or more characteristics of the second wireless network.

In example four, the method of example 1 may comprise receiving an input signal indicating manual selection of the second wireless network from a list of available wireless networks.

In example five, the first and second wireless connections established using a same wireless radio.

In example six, the first and second wireless networks comprising wireless local area networks (WLAN).

In example seven, the method of example 1 may comprise creating the virtual wireless adapter by splitting a wireless local area network (WLAN) stack into two or more virtual stacks, a first of the two or more virtual stacks to maintain the first wireless connection and a second of the two or more virtual stacks to initiate the second wireless connection.

In example eight, the method of example 1 may comprise determining that the second wireless connection was successfully established, and reducing the number of virtual stacks to one stack.

In example nine, the method of example 1 may comprise acquiring one or more of a Dynamic Host Configuration Protocol (DHCP) address or an Internet Protocol (IP) address from the second wireless network using the virtual wireless adapter.

In example ten, the method of example 1 may comprise transitioning one or more applications to the second wireless network.

In example eleven, an apparatus may comprise means for performing the method of any of examples one to ten.

In example twelve, at least one machine-readable medium comprising a plurality of instructions that in response to being executed on a computing device cause the computing device to carry out a method according to any of examples one to ten.

In example thirteen, a wireless communications device may be arranged to perform the method of any of examples one to ten.

In example fourteen, an apparatus for switching between wireless network may comprise a processor component, a radio coupled to the processor component, and wireless network switching logic to be executed on the processor component to split a wireless stack into two or more virtual wireless adapters, maintain a first wireless connection with a first wireless network using a first of the two or more virtual wireless adapters, initiate a second wireless connection with a second wireless network using a second of the two or more virtual wireless adapters, disconnect the first wireless connection with the first wireless network, establish the second wireless connection with the second wireless network, and remove any unused virtual wireless adapters.

In example fifteen, the wireless network switching logic of example 14 may be operative to automatically select the second wireless network from a list of available wireless networks based on one or more characteristics of the first wireless network or one or more characteristics of the second wireless network or to receive an input signal indicating manual selection of the second wireless network from a list of available wireless networks.

In example sixteen, the first and second wireless connections established using the radio.

In example seventeen, the first and second wireless networks comprising different wireless local area networks (WLAN).

In example eighteen, the wireless stack comprising a wireless local area network (WLAN) stack.

In example nineteen, the wireless network switching logic of example fourteen may be operative to determine that the second wireless connection was successfully established and reduce the number of virtual stacks to one stack.

In example twenty, the wireless network switching logic of example fourteen may be operative to acquire one or more of a Dynamic Host Configuration Protocol (DHCP) address or an Internet Protocol (IP) address from the second wireless network using the second of the two virtual wireless adapters.

In example twenty-one, a system for switching from a first wireless network to a second wireless network may comprise a processor component, memory coupled to the processor component, a radio coupled to the processor component, one or more antennas coupled to the radio, and wireless network switching logic to be executed on the processor component to split a wireless stack into two or more virtual wireless adapters, maintain a first wireless connection with a first wireless network using a first of the two or more virtual wireless adapters, initiate a second wireless connection with a second wireless network using a second of the two or more virtual wireless adapters, disconnect the first wireless connection with the first wireless network, establish the second wireless connection with the second wireless network, and remove any unused virtual wireless adapters.

In example twenty-two, the wireless network switching logic of example twenty-one may be operative to automatically select the second wireless network from a list of available wireless networks based on one or more characteristics of the first wireless network or one or more characteristics of the second wireless network or to receive an input signal indicating manual selection of the second wireless network from a list of available wireless networks.

In example twenty-three, the first and second wireless connections established using the radio.

In example twenty-four, the first and second wireless networks comprising different wireless local area networks (WLAN).

In example twenty-five, the wireless stack comprising a wireless local area network (WLAN) stack.

In example twenty-six, the wireless network switching logic of example twenty-one may be operative to determine that the second wireless connection was successfully established and reduce the number of virtual stacks to one stack.

In example twenty-seven, the wireless network switching logic of example twenty-one may be operative to acquire one or more of a Dynamic Host Configuration Protocol (DHCP) address or an Internet Protocol (IP) address from the second wireless network using the second of the two virtual wireless adapters.

The foregoing examples and embodiments are set forth for purposes of illustration and not limitation. As such, other embodiments are described and claimed.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The invention claimed is:

1. A method for switching between wireless networks, comprising:
   creating a virtual wireless adapter by splitting a wireless local area network (WLAN) stack into two or more virtual stacks, a first virtual stack of the two or more virtual stacks to maintain a first wireless connection and a second virtual stack of the two or more virtual stacks to initiate the second wireless connection;
   maintaining the first wireless connection with a first wireless network using the first virtual stack;
   initiating the second wireless connection with a second wireless network using the second virtual stack while maintaining the first wireless connection;
   verifying quality of the second wireless connection;
   in response to verifying the quality of the second wireless connection, transitioning at least one application from the first virtual stack to the second virtual stack, and disconnecting the first wireless connection with the first wireless network; and utilizing the second wireless connection with the second wireless network.

2. The method of claim 1, comprising automatically selecting the second wireless network from a list of available wireless networks based on one or more characteristics of the first wireless network or one or more characteristics of the second wireless network.

3. The method of claim 1, comprising receiving an input signal indicating manual selection of the second wireless network from a list of available wireless networks.

4. The method of claim 1, the first and second wireless connections established using a same wireless radio.

5. The method of claim 1, the first and second wireless networks comprising wireless local area networks (WLAN).

6. The method of claim 1, the two or more virtual stacks each having at least a Transmission Control Protocol/Internet Protocol (TCP/IP) component and a virtual wireless adapter.

7. The method of claim 1, comprising:
determining that the second wireless connection was successfully established; and
reducing the number of virtual stacks to one stack.

8. The method of claim 1, comprising:
acquiring one or more of a Dynamic Host Configuration Protocol (DHCP) address or an Internet Protocol (IP) address from the second wireless network using the virtual wireless adapter.

9. An apparatus for switching between wireless networks, comprising:
a processor component;
a radio coupled to the processor component; and
wireless network switching logic to be executed on the processor component to:
split a wireless stack into two or more virtual stacks each including a virtual wireless adapters and a Transmission Control Protocol/Internet Protocol (TCP/IP) component,
maintain a first wireless connection with a first wireless network using a first virtual stack,
initiate a second wireless connection with a second wireless network using a second virtual stack while maintaining the first wireless connection,
verify quality of the second wireless connection;
transition at least one application from the first virtual stack to the second virtual stack,
disconnect the first wireless connection with the first wireless network,
utilize the second wireless connection with the second wireless network, and
remove any unused virtual stacks.

10. The apparatus of claim 9, the wireless network switching logic to automatically select the second wireless network from a list of available wireless networks based on one or more characteristics of the first wireless network or one or more characteristics of the second wireless network or to receive an input signal indicating manual selection of the second wireless network from a list of available wireless networks.

11. The apparatus of claim 9, the first and second wireless connections established using the radio.

12. The apparatus of claim 9, the first and second wireless networks comprising different wireless local area networks (WLAN).

13. The apparatus of claim 9, the wireless stack comprising a wireless local area network (WLAN) stack.

14. The apparatus of claim 9, the wireless network switching logic to determine that the second wireless connection was successfully established and reduce the number of virtual stacks to one stack.

15. The apparatus of claim 9, the wireless network switching logic to acquire one or more of a Dynamic Host Configuration Protocol (DHCP) address or an Internet Protocol (IP) address from the second wireless network using the second of the two virtual wireless adapters.

16. The apparatus of claim 9, comprising one or more antennas coupled to the radio, and a memory coupled to the processor component.

17. The apparatus of claim 9, comprising a network interface coupled to the processor component.

18. At least one non-transitory computer-readable storage medium comprising instructions that, when executed, cause a system to:
create a virtual wireless adapter by splitting a wireless local area network (WLAN) stack into two or more virtual stacks, a first virtual stack of the two or more virtual stacks to maintain a first wireless connection and a second virtual stack of the two or more virtual stacks to initiate the second wireless connection;
maintain the first wireless connection with the first virtual stack;
initiate the second wireless connection with the second virtual stack while maintaining the first wireless connection;
verify quality of the second wireless connection;
transition at least one application of the first virtual stack to the second virtual stack;
disconnect the first wireless connection with the first wireless network; and
utilize the second wireless connection with the second wireless network.

19. The at least one non-transitory computer-readable storage medium of claim 18, comprising instructions that when executed cause the system to select the second wireless network from a list of available wireless networks based on one or more characteristics of the first wireless network or one or more characteristics of the second wireless network.

20. The at least one non-transitory computer-readable storage medium of claim 18, comprising instructions that when executed cause the system to receive an input signal indicating manual selection of the second wireless network from a list of available wireless networks.

21. The at least one non-transitory computer-readable storage medium of claim 18, comprising instructions that when executed cause the system to determine that the second wireless connection was successfully established, and reduce the number of virtual stacks to one stack.

* * * * *